United States Patent
Orr et al.

(10) Patent No.: US 8,146,160 B2
(45) Date of Patent: Mar. 27, 2012

(54) METHOD AND SYSTEM FOR AUTHENTICATION EVENT SECURITY POLICY GENERATION

(75) Inventors: Douglas B. Orr, Ann Arbor, MI (US); Thomas Henry Ptacek, Ann Arbor, MI (US); Douglas Joon Song, Ann Arbor, MI (US)

(73) Assignee: Arbor Networks, Inc., Chelmsford, MA (US)

( * ) Notice: Subject to any disclaimer, the term of this patent is extended or adjusted under 35 U.S.C. 154(b) by 623 days.

(21) Appl. No.: 10/887,213

(22) Filed: Jul. 8, 2004

(65) Prior Publication Data

US 2005/0216956 A1 Sep. 29, 2005

Related U.S. Application Data

(60) Provisional application No. 60/555,791, filed on Mar. 24, 2004.

(51) Int. Cl.
*H04L 29/06* (2006.01)
(52) U.S. Cl. ............. 726/23; 726/1; 726/11; 726/12; 726/13; 726/22; 726/24; 713/168
(58) Field of Classification Search .......... 726/1, 22–24, 726/11–13; 713/168
See application file for complete search history.

(56) References Cited

U.S. PATENT DOCUMENTS

| | | | | |
|---|---|---|---|---|
| 5,621,889 A * | 4/1997 | Lermuzeaux et al. | ......... | 726/22 |
| 5,913,025 A * | 6/1999 | Higley et al. | ......... | 726/4 |
| 6,742,047 B1 * | 5/2004 | Tso | ......... | 709/246 |
| 7,042,988 B2 * | 5/2006 | Juitt et al. | ......... | 379/88.17 |
| 7,360,086 B1 * | 4/2008 | Tsuchiya et al. | ......... | 713/168 |
| 7,469,341 B2 * | 12/2008 | Edgett et al. | ......... | 713/176 |
| 2003/0051026 A1 * | 3/2003 | Carter et al. | ......... | 709/224 |
| 2003/0145225 A1 * | 7/2003 | Bruton et al. | ......... | 713/201 |
| 2003/0200455 A1 * | 10/2003 | Wu | ......... | 713/200 |
| 2004/0015719 A1 * | 1/2004 | Lee et al. | ......... | 713/201 |
| 2004/0042470 A1 * | 3/2004 | Cooper et al. | ......... | 370/401 |
| 2004/0103211 A1 | 5/2004 | Jackson et al. | | |
| 2004/0123153 A1 * | 6/2004 | Wright et al. | ......... | 713/201 |
| 2004/0123156 A1 * | 6/2004 | Hammond et al. | ......... | 713/201 |
| 2005/0193427 A1 * | 9/2005 | John | ......... | 726/1 |
| 2005/0198531 A1 * | 9/2005 | Kaniz et al. | ......... | 713/201 |

OTHER PUBLICATIONS

U.S. Appl. No. 10/684,964, filed Oct. 14, 2003, Ptacek et al.

* cited by examiner

*Primary Examiner* — Edan Orgad
*Assistant Examiner* — Kari Schmidt
(74) *Attorney, Agent, or Firm* — Houston Eliseeva, LLP

(57) ABSTRACT

A method and system allows for the deployment of security policies into the higher layers of the OSI model. Specifically, it allows for the establishment of security policies at layer 4 and higher, by monitoring authentication flows and using these flows as the basis for establishing security policies which then can be used as a basis for assessing the operation of the network.

34 Claims, 4 Drawing Sheets

METHOD AND SYSTEM FOR AUTHENTICATION EVENT SECURITY POLICY GENERATION

BACKGROUND OF THE INVENTION

Host computers, including servers and client computers, are typically interconnected to form computer networks. A computer network, and more generally a communications network, is a group of devices or network entities that are interconnected by one or more segments of transmission media on which communications are exchanged between those network entities. The communications can be transmitted electrically, including wireless links, or optically. The computer networks typically further comprise separate network communications devices, such as routers, switches, bridges, access points, and hubs, for transmitting and relaying the communications between the network entities, through the network's mesh.

Computer networks are typically classified by their size or by the type of entity that owns the network. Often, business organizations maintain large computer networks. These computer networks are referred to as enterprise networks. Enterprise networks are typically connected to other enterprise networks or home networks via service provider and public networks.

At the enterprise, service provider, and public network scale, network management systems are used to monitor and manage the networks. These systems can exist as stand-alone, dedicated systems or be embedded in network communications devices such as routers and switches. One specific example is NetFlow technology offered by Cisco Systems. Other tools include special-purpose systems, such as firewalls, that are typically used to manage the communications at boundaries between the networks.

Both firewalls and network management systems allow the network administrator to apply security policies. Policies are typically used to govern or dictate how entities are allowed to communicate over the network. These policies can be applied to entities individually, by setting operating parameters of devices separately. Policy-based management systems have simplified configuration of devices by allowing administrators to define a policy and apply this policy across groups of network entities, generally.

A policy is a collection of rules. A rule can, for example, govern what traffic a particular firewall ignores or prevents/blocks. Other rules can govern whether a given address or device can access a particular service or network resource. The rules can also be applied by routers that decide whether to forward packets from or to a particular address.

Unfortunately, these policy-based management systems have limitations in the types of policies that can be defined and/or implemented, being typically limited to lower layers of the communications stack.

The process for abstracting the dataflow between the network entities is typically articulated in the context of the OSI (Open Systems Interconnection) model communications stack. The lowest layer describes physical layer functions such as the transmission of bits over the communication medium, activation/deactivation of the physical connection, use of idle conditions, control bit generation/detection, start and stop, and zero bit insertion. These functions are requested by data link layer functions, which control the transmission of packets over a logical communications link. Other data link functions include establishing/releasing logical connections, error detection, correction, and recovery, in conjunction with the delimiting of transmitted packets.

At the next higher level of abstraction is the network layer. Functions here include the transfer of data units or packets between two transport entities. Further, at this layer, routing through the network is determined, including segmenting or combining packets into smaller and larger data units, the establishment, maintenance, and relinquishment of end-to-end logical circuits, and the detection and recovery from errors. Network management activities often take place at the network layer and data link layer.

Then, the transport layer functions to handle the transmission of complete messages between network entities. At this layer, sessions between the network entities are established and then taken down. This layer ensures the correct sequence of packets, partition, and combination of messages into packets, and the control of data flow to avoid network overload.

The session layer organizes and synchronizes the dialog that takes place between applications running on network entities. This provides a one-to-one correspondence between a session connection and a presentation connection at a given time. It provides for session continuity, even when transport connections may fail.

Finally, at the two highest levels of abstraction, the presentation layer provides independence from differences between data presentations, such as encryption, by translating from application to network format, and back; and the application layer supports application and end user processes. However, user authentication and privacy are also considered and any constraints on data syntax are identified. At this layer, communication is application-specific.

Network security policies typically control the relatively low layers in the OSI model, such that the policies' rules usually govern the operation of the data link and network layers, only. In case of a firewall, a policy defines types of network communications through the firewall that are authorized and types of network accesses that are unauthorized, typically based on media access control (MAC) and internet protocol (IP) addresses. Administrators define a policy for access between external systems to the enterprise network and the network entities on the network and then use the firewall to enforce that policy.

Recently, systems have been proposed and deployed that enable automatic definition of policies. For example, as described in U.S. Pat. Publication No. US2004/0103211 A1, entitled "System and Method for Managing Computer Networks", filed Nov. 21, 2002, by Jackson, et al. traffic in a computer network is monitored. The collected flow information is then used to create a network policy for hosts on the network. This is done automatically by the system, which arranges the hosts into hierarchical clusters, based upon similarity values that are determined by the system.

More recently, as described in U.S. application Ser. No. 10/684,964, filed on Oct. 14, 2003, entitled "Method and System for Reducing Scope of Self-Propagating Attack Code in Network", by Thomas H. Ptacek, et al., systems for establishing a pervasive policy have been proposed. These systems rely on the deployment of firewall or firewall-like devices to compartmentalize the enterprise or service provider network. This allows for the tracking of communications through the network, at the enterprise or service provider scope, and, by using previously defined policies, the selective closing down of communications between the compartments to confront or mitigate network attacks, while allowing authorized communications to continue.

In contrast, authentication security systems employ higher layers in the OSI stack. These typically run on the network entities themselves. They function to ensure that someone or something is, in fact, who or what it is claiming to be.

One example is a protocol referred to TACACS. This acronym stands for Terminal Access Controller Access Control System. It is an authentication protocol that was developed by the Defense Data Network (DDN) community. It provides for remote access authentication and related services, such as event logging. User passwords are administered in a central database, rather than on individual routers or server computers, for example. This provides for a scalable network security solution.

Another authentication protocol is Remote Authentication Dial-In User Server/Service (RADIUS). It has been commonly deployed in dial-up networks and is used by many network access server (NAS) vendors. This authentication program allows the NAS to offload user administration to a central server.

Lightweight Directory Access Protocol (LDAP) and the Active Directory® authentication system are systems used by networking systems produced by the Microsoft Corporation. These protocols and tool replaced an older system referred as Network Basic Input/Output System (NETBIOS), which includes authentication functions as part of NETBIOS communications suite.

SUMMARY OF THE INVENTION

As a general rule, network monitoring systems are able to protect applications or network entities at the lower OSI model layers. The data link layer monitoring encompasses switch security topics such as address resolution protocol (ARP) spoofing, which involves redirecting traffic by corrupting the mapping of layer 2 MAC addresses to layer 3 IP addresses. Other examples of data link layer-related security issues are MAC flooding and spanning tree attacks. Policies directed toward network switches can help protect the network from these attacks. The network and transport layers are where routers and firewalls function. Threats that occur at these levels are unauthorized retrieval of endpoint identity, unauthorized access to internal systems, and SYN flood attacks. Security enforcement techniques directed at Network Address Translation, Access Control Lists, and firewalls mitigate these risks.

The Session and Presentation layers are in the application layer set of the OSI model. At these layers the information technology (IT) manager's ability to mitigate application security risks at the network scale using policies directed toward network communications devices begins to diminish as conventional network monitoring systems become inapplicable. Here, application developers take a bigger role in protecting applications by relying on existing authentication system application programming interfaces (API's) and authentication protocols. IT managers can thus generally confront unauthorized login/password accesses and unauthorized data accesses by relying on encryption and authentication methods, which are configured on a device-by-device or user-by-user basis.

The present invention is directed to a method and system that provides for the definition, validation, compliance monitoring and/or deployment/enforcement of security policies into the higher layers of the OSI model, using network monitoring. Specifically, it allows for the establishment of security policies at layer 4 and higher, by monitoring authentication flows and using these flows as the basis for establishing security policies and provides a mechanism for detecting violations of those policies across the network. According to the invention, network communications monitoring can be better mapped against specific users, instead of IP or MAC addresses as in conventional systems.

In general, according to one aspect, the invention features a method for monitoring security in a computer network. The method comprises detecting authentication events on the computer network and obtaining information from the authentication events. Authenticated user behavior is then modeled.

In general, according to another aspect, the invention features a method for generating security policies for a computer network. The method comprises detecting authentication events on the computer network, extracting authentication information from the authentication events, and using the authentication information to define security policies.

In embodiments, the step of detecting authentication events is performed by collectors that monitor authentication servers, such as by monitoring log files from authentication servers, or via application programming interfaces.

The step of extracting authentication information typically comprises capturing user names, host computer addresses and communications protocols, and the step of using the authentication information comprises defining security policies based on the authentication information.

In general, according to another aspect, the invention features a method for monitoring security in a computer network. This method comprises detecting communication events on the computer network, extracting authentication information from the communication events, and generating a model of the authentication state of the network.

In general, according to still another aspect, the invention features a method for monitoring security in a computer network. This method comprises detecting communication events on the computer network, extracting authentication information from the communication events, and comparing the authentication information against security policies for the network.

The invention can also be characterized as a computer network security system, which comprises collectors for monitoring network communications events and authentication events and a modeling mechanism for combining information from the network communications events and the authentication events into a model describing network activity. Alternatively, or in addition, a notification system can be provided for generating an alert if the network communication events violated security policies derived from previous monitoring of authentication events on the network.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
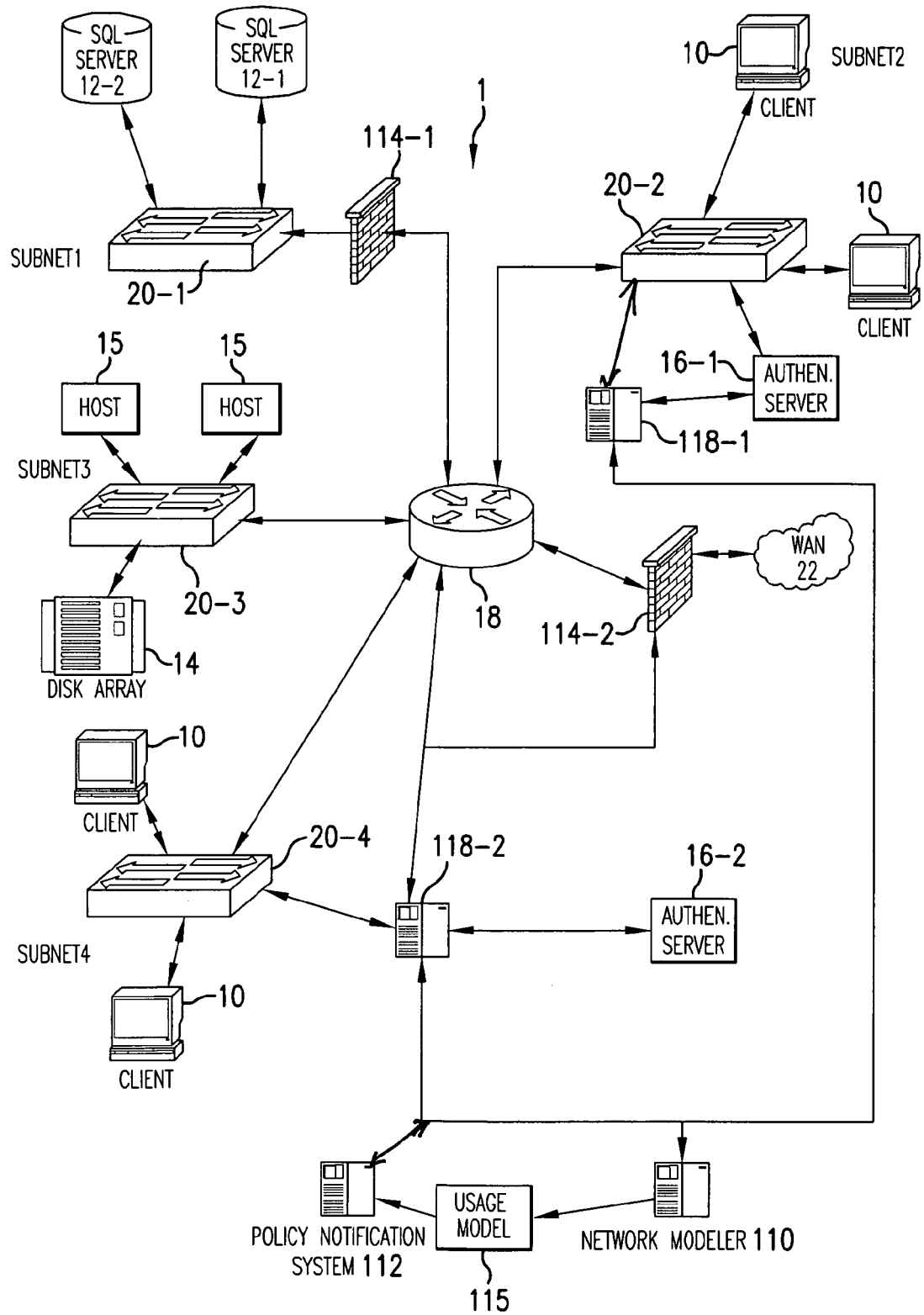
FIG. 1 is a block diagram showing an exemplary computer network including a system for protecting the network from attack, according to the present invention.

FIG. 1 shows a communications network 1 that is constructed according to the principles of the present invention.

In the illustrated example, the communications network 1 is the network for an enterprise such as a large company. This configuration, however, is shown by way of illustration. In other implementations, the present invention is applied to service provider networks, which provide communications between enterprise networks, individuals, and/or public networks.

Generally, the exemplary, illustrated communications network 1 comprises a series of sub-networks (subnet1-subnet4). These subnets typically include groups of network devices or further sub-networks. As characteristic of many enterprise networks, for example, the subnets include different types of network devices. For example, subnet2 includes one or more host computers such as workstations 10, or network client computers, and an authentication server 16-1. Subnet4 also includes host computers, such as clients 10, and a second authentication server 16-2. Subnet1 and subnet3 include one or more host computers 15, SQL servers 12-1, 12-2, and disk array 14.

Network communications devices interconnect the network devices or entities of the subnets. In the illustrated example, switches 20-1, 20-2, 20-3, and 20-4 provide connectivity between the network devices in subnet 1, subnet2, subnet3, and subnet4, respectively, and uplinking to a router 18. The router 18 provides connectivity between the switches 20-1, 20-2, 20-3, 20-4 and external networks such as a wide area network (WAN), a service provider network, or InterNet 22.

Network firewalls 114-1, 114-2 are further shown. Specifically, firewall 114-1 is deployed to protect subnet1 to protect critical network assets such as SQL servers 12-1, 12-2, whereas the second firewall 114-2 is more conventionally deployed between the enterprise network 1 and the wide area network 22.

The illustrated network layout is not critical to the invention, but simply illustrates one enterprise configuration in which host computers and client computers are aggregated with each other in order to facilitate administration. For example, in the implementation in which the system is applied to a service provider network or public network, the subnets subnet1-subnet4 would correspond, for example, to the networks of different enterprises or corporations.

The inventive network monitoring, or more generally network control, system performs a series of functions that are performed by one or separate hardware devices. Generally these functions include: 1) collecting authentication events; 2) modeling information flows through the network 1, especially during normal operation of the network, or over its lifetime; 3) generating security policies describing or based on the collected network flow data, network endpoints, and authenticated users; 4) maintaining a current authentication state for the network which state associates authenticated users with network endpoints with which they are currently initiating or receiving network communication, based on information from authentication servers or by monitoring network communications; 5) comparing ongoing traffic with security policy and detecting divergence from the security policy that implies improper activity or activity that violates a network policy; 6) generating an alert such as to an administrator, or even dictating a change in a configuration of the network to enforce the policy such as by reconfiguring network communications devices, a firewall or router for example, authentication servers, host computers, or server computers.

In short, the system compares ongoing communications with the security policy. Typically this policy describes how endpoints or network entities are permitted to talk to each other in terms of allowed protocols, for example, and can be extended to include descriptions of how users are permitted to talk with each other. Thus, user communication and host communication are modeled. Monitoring of authentication events at authentication servers enables the system to track what users are logged in where. Thus, comparisons against a user-based policy are possible.

The logical elements of the system include a Network Modeling Mechanism (NMM) 110, which is the system that tracks network usage and generates a model 115 describing the behavior of network devices on the network 1 and actual users by reference to authentication information from authentication servers, for example. A policy notification system 118 uses the model 115 to generate policies, during a learning mode. During an active mode, the model database 115 is used to store the authentication state of the network 1, such as which users or computers are logged onto each other. The policy notification system 118 uses the policies or model 115 to generate alerts or other responses if the policies are violated.

The NMM 110 is driven by network observations from a variety of network sources, i.e., collectors. In some implementations, the collectors watch traffic directly from a router or switch and form the authentication flows themselves, typically via a span port or a network tap. Thus, the collector passively watches a copy of traffic passing through the network communications device and to/from an authenticating device such as an authentication server.

In the current embodiment, authentication activity is acquired by monitoring the log files from the authentication servers or by directing interrogating the authentication servers via their application programming interface (API).

FIG. 1 illustrates these various approaches to collector deployment. Specifically, collector computer 118-1 is connected to directly access authentication server 16-1. This allows collector 118-1 to analyze the authentication server's log file.

The authentication server log file is typically in the form of chronological list of authentication events. The file identifies users seeking authentication, the address of the device that the users are using for access, the address of the device to which the users are seeking access, whether the user was authenticated and is logging-in or logging-out, and a timestamp indicating the time of the event. One example is as follows:

| Authentication Server Log File | | | | |
|---|---|---|---|---|
| user name/ID | device IP address | IP address of target device | Authenticated? | time-stamp |
| jsmith | 10.10.10.12 | 10.10.10.10 | log-in | 12:23:25 |
| esmall | 10.10.10.15 | 10.10.10.25 | No | 16:13:47 |
| obig | 10.10.10.08 | 10.10.10.14 | log-in | 17:08:17 |
| jsmith | 10.10.10.15 | 10.10.10.10 | log-out | 23:55:02 |
| . | . | . | . | . |
| . | . | . | . | . |
| . | . | . | . | . |

In other examples, the collector is not directly connected to the authentication server. Instead the authentication information, such as in the form of a log file, is transmitted to the collector, such as collector 118-2, or possibly directly to the NMM 110 over the network 1.

In collector configurations, the collectors are also connected to monitor network traffic such as via a network communications device. For example, in the illustrated implementation, collector 118-2 is directly connected to receive information from the router network communications device 18 and the firewall 114-2; collector 118-1 is connected to access switch 20-2. The collectors receive digested flow information and/or a copy of the packets transmitted through the network communications devices. In many examples, this information is available via the network management protocols that are typically embedded on routers, switches, and hubs (including SNMP, NetFlow, and RMON) or log file analysis (as from firewalls and host logging systems). This flow information is then transferred to the NMM 110. Generally, the system is Page: 11
using authentication event information, derived from authentication servers, to make policies that apply to network communications, and usually network communications devices. Thus, it is important to monitor the network communications to assess compliance with the policies, principally during the active mode, and transmit information concerning the communications to the policy notification system 112.

In the examples, collector monitoring computers 118-1, 118-2 accumulate information concerning authentication events, including authentication protocol, communications protocol, source and destination port addresses, source and destination IP addresses, user seeking authentication, and the network entity, such as server, for which authentication is being sought. Also, when the collector is deployed to access the information from a network communications device (18, 114-2) or directly from the authentication server (16-1), the collector handles the formatting of the requests using the host device API, for example, and reformats the received data into a form to be communicated to the NMM 110 or policy notification system 112.

The NMM 110 analyzes authentication event information from the collectors 118-1, 118-2, condensing the information into a usage model database 115 that describes relationships between network devices in term of authentication access. For instance, an authentication flow event establishing login of given user on given client computer 10 by authentication server 16-1 can establish the single relationship between the user and the target with which the user is communicating, such as server 12-1. This relationship further preferably includes protocol information used between the user and the target such that the relationship includes a given protocol such as Telnet. Information describing the communications between the user and the target is also accumulated by monitoring the packet flows through the network communications devices.

If the totality of all such relationships observed on the network 1 comprises a reasonable subset of all the actual relationships between users, network devices, such as client computers, and the authentication servers 16-1, 16-2 on the network 1, NMM 110 has inferred a covering "usage model" of the network 1 concerning authentication. This usage model 115 is maintained and stored by the NMM 110. In the preferred embodiment, the NMM 110 periodically maintains and updates the usage model 115 as changes are made to the network 1 or legitimate network usage evolves. With a covering usage model, it is very likely that any legitimate, in-use service on the network is described by the database 115.

In some instances, the usage model is "manually updated or revised". Here, a network administrator will manually review the usage model 115 to ensure that the model covers these critical and/or infrequent network communications, and if the model does not, the administrator modifies the usage model to ensure that the communications are covered by manually adding a relationship between users, network devices, such as network computers.

Figure 2:
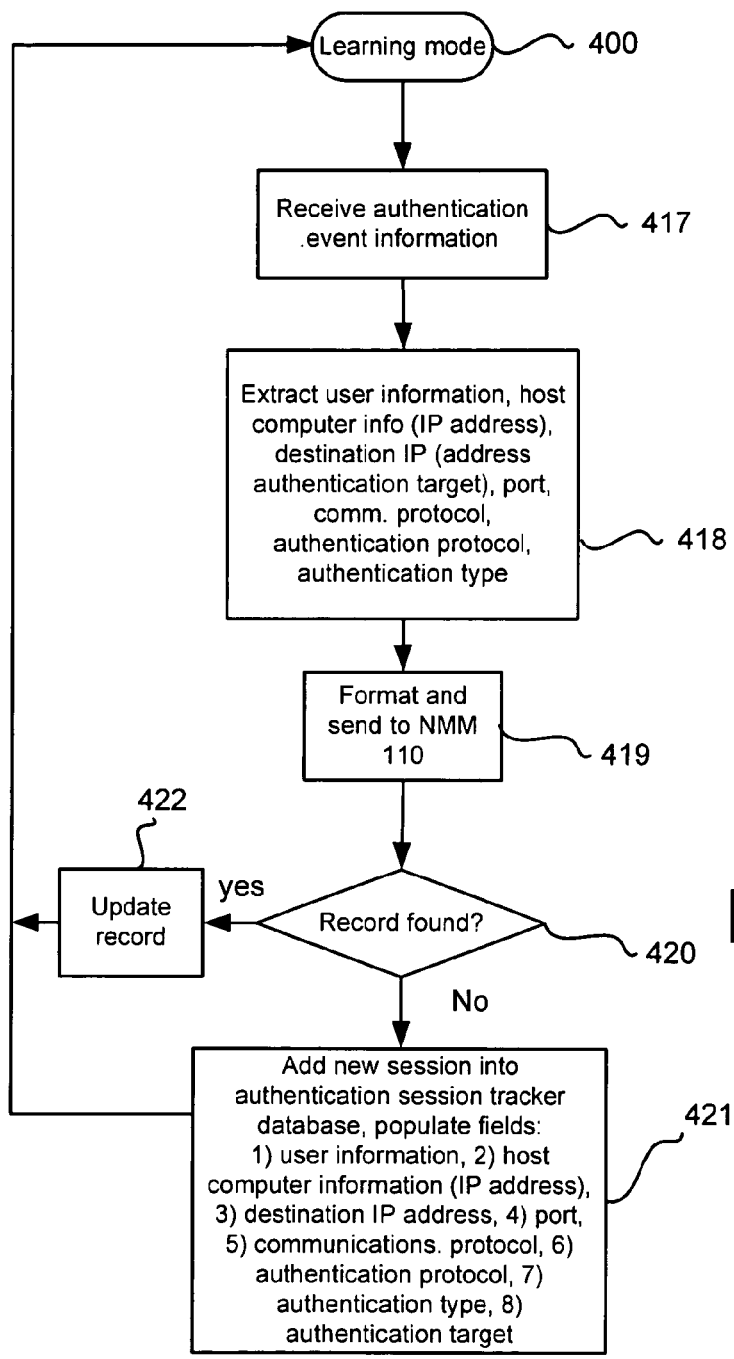
FIG. 2 is a flow diagram illustrating extraction of authentication event information and its inclusion into the usage model, according to the present invention.

FIG. 2 shows the process of generating or updating the usage model 115, according to one embodiment. This process flow is used when the collector 118 is directly accessing the authentication server 16, as in the example of collector 118-1 and authentication server 16-1.

This usage model generation is initiated by the selection of a learning mode 400 by a network operator or system installer, for example. In other examples, the learning mode is periodically triggered by the system itself to maintain model and ensure that it is current. Typically, the learning mode is performed during a period in which the network is operating nominally and is not undergoing any sort of attack or topology changes, for example.

Generally, the model 115 of the network 1 is created by collecting network flows and generating records describing specific or generalized communication patterns between devices or users. The permitted communication signatures are then stored in a database maintained by the NMM 110 which functions as the usage model 115.

Information describing the authentication events is received by collecting device 118-1, such as from the log file or by interrogation of the authentication server 16-1, in step 417.

In one embodiment, the authentication information or data concerning the user information, host computer information (IP address), destination IP address/desired resource ID, communications port, communications protocol, authentication protocol, and authentication type are collected in step 418.

Generally, the user information is the network user ID or login name of the user on a client computer, for example, that is seeking access to a network data or compute resource described by the destination IP address/desired resource ID.

Destination IP address/desired resource ID refers the entity to which the user or the user's computer is seeking access. This is a specific device with a unique IP address.

In an exemplary authentication flow, the computer of the user requesting access to given target resource or computer contacts the authentication server, which issues a token. This token is provided to the target device, which provides access after confirming the validity of that token for the requested resource.

The communications port and communications protocol refer to the actual protocol and port used by the authentication request. For example, UDP port 49 is used for TACACS and TACACS+ communications, whereas LDAP and CLDAP utilize TCP port 389, for example.

Authentication protocol and authentication type refer to the authentication protocol and the nature of the requested authentication with that protocol. Common authentication protocols include TACACS, TACACS+, RADIUS, LDAP, Active Directory® system, and NETBIOS. Exemplary authentications include user log-in and log-out information.

In step 419, the extracted information is converted to a standardized format and transmitted to the NMM 110 by the collector 118-2. This formatting enables the NMM 110 to be insulated from the particular source from which the information was gathered.

In step 420, the NMM 110 determines whether the received authentication event is covered by the current version of the model 115. Specifically, the received combination of user information, host computer information (IP address), destination IP address/desired resource, communications port, communications protocol, authentication protocol, and authentication type are used as a lookup criteria into the usage model 115.

If a corresponding session is not found, then a new record is added to the model in step 421. The record format for the signature database, in one embodiment, has fields holding data describing the user information, user host computer information (IP address), destination IP address, desired resource descriptor, communications protocol, communications port, authentication protocol, and authentication type, respectively.

The record created field holds the date that the authentication event or signature was both first detected and the associated record in the model 115 created. A field last-detected is initially set to the value of the record creation date, but is subsequently updated with the last time that the authentication event or signature was detected. A frequency-detected field holds a running average describing how often the event is detected.

Finally, the valid field is used as a flag to indicate whether the session is valid for the usage model, and is typically initially set to true. A network administrator may subsequently set this field to false, if it is determined that the event should not be used as a basis for describing the covering usage model prospectively, for example. In other examples, the NMM 110 applies an established validity criteria or filter to detected events. For example, the validity is only set to true if the source IP address is within a specified subnet of IP addresses corresponding to established users.

In contrast, if the signature record is present in the usage model database, then the record fields, such as record-created, last-detected, and frequency-detected fields, are updated in step 422.

Figure 3:
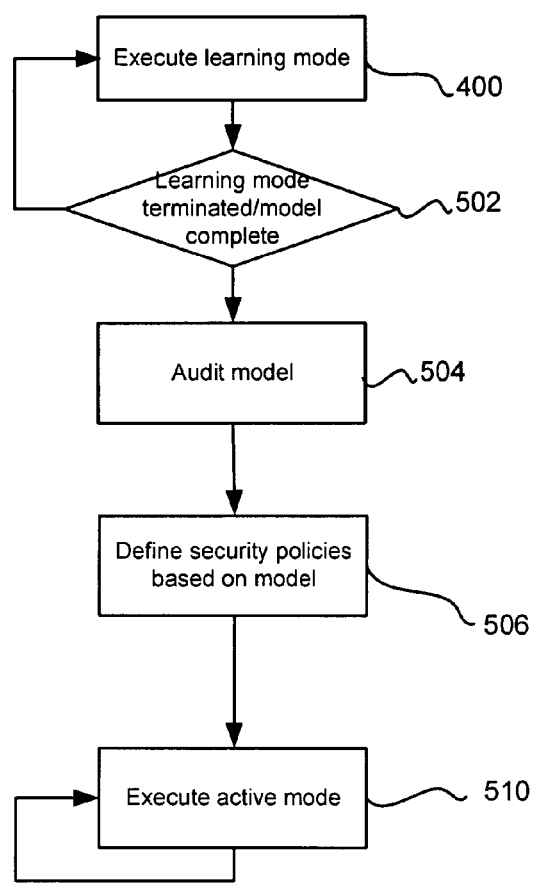
FIG. 3 is a flow diagram illustrating the transitioning between learning and active mode, according to the present invention.

FIG. 3 illustrates a higher level control process performed by the NMM 110 dictating selection between the learning and active modes.

In more detail, typically after initialization the learning mode 400 performed.

If the totality of all recorded authentication signatures comprises a reasonable subset of all the actual relationships on the network, it can be said that the modeling system has inferred a covering "usage model" 115 of the network 1. With a covering usage model, it is very likely that any legitimate, in-use service on the network is described by the database.

In step 502, it is determined whether the learning mode is complete. In some cases, the NMM 110 automatically determines when a covering model has been defined. In other examples, the existence of the covering model is determined by a network administrator.

One metric for determining the quality of the model is the degree to which the model definition has stabilized. In one example, the covering model is determined based on whether the model has stabilized and converged. In any event, an auditing step is usually performed on the defined security policies in step 504. This is performed before conversion to the active mode. This allows the network operator to ensure that there will be no disruptions of legitimate network communications by policies that are too restrictive on such communications, or to ensure that the model does not contain illegitimate communications.

Once the model is defined, then the NMM 110 creates the security policies based on the model in step 506. In one example, the policies are set such that only communication events set forth on the model are allowed communication events. As a result, if the model includes only a communication event C between authenticated user A and authenticated user B, then only this communication event will be allowed by the rules of the policy. Thus, the security policies are established based on a catalog of user and host behaviors described by the usage model.

It is relevant to note that in other systems, such as that described in the incorporated patent applications, network traffic is also monitored and usage models generated. In those cases, the usage models are indexed based on the IP addresses, typically, of the network entities, such as client computers. In contrast, in the present invention indexing is also performed based on actual user information, such as user name, in addition to IP address. This user information is obtained by access to the authentication server log files for example. Thus, the present system is able to associate network communication flows between host with specific user IDs. This allows the present system to function in environments in which IP addresses change or are even assigned dynamically as in the case where IP addresses are assigned by a Dynamic Host Configuration Protocol (DHCP) server. In previous systems, a usage model might not converge to a covering usage model or an established usage model rendered irrelevant if the underlying IP address mapping for the network changed. In contrast, the present invention avoids this problem by generating a model that is user-based. This is relevant in the security context since specific users are the common source of security breaches either because the user is seeking to access information for which there is no authorization or a user name/password combination has been stolen by an unauthorized user.

Upon establishing the security policies, the system transitions to the active mode 510.

Figure 4:
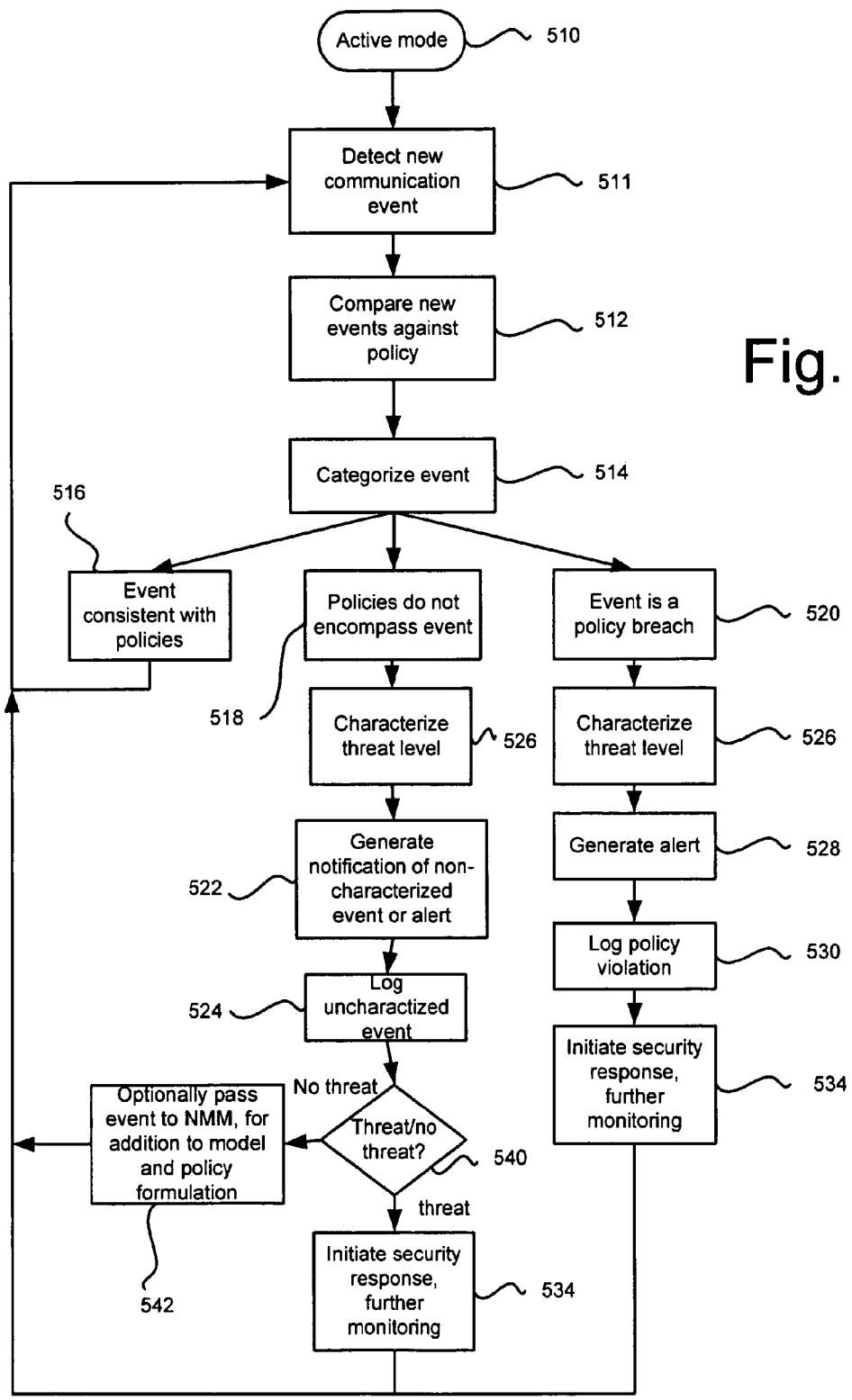
FIG. 4 is a flow diagram illustrating the application of the policies during the active mode and system responses, according to the present invention.

FIG. 4 illustrates the steps performed during the active mode 510 by the policy notification system 112.

Specifically, in step 511 newly detected communication events are analyzed against the security policies based on the network model by the policy notification system 112. These communication events are detected by the collectors 118-1 and 118-2, in one embodiment, by accessing the corresponding network communications devices 20-2 and 18, respectively. Typically, the authentication events are detected by the collectors 118-1, 118-2 that were used during the learning mode.

The collected events are used to maintain current authentication state that will drive policy enforcement. Specifically, data from the detected authentication event such as user information, user host computer information (IP address), authentication protocol, and authentication type (log-in/log-out) are entered into the model database that describes the current state of authenticated users during the active mode. In addition, stale policy data are periodically removed from the model database. In this way, the model 115 is kept current.

The authentication information is used to keep an active map of what users are logged into what endpoints. This information will allow correlating endpoint communication with user permissions; if two endpoints are engaged in communication with one another, the communication must be permitted because the policy dictates that communication is permissible between the endpoints, between the users logged into the endpoints or between a user and an endpoint.

A comparison of the event characteristics against the security policy (step 512) results in a categorization of the event in step 514. Specifically, the NMM 110 determines whether a communication event is covered by the current model 115. Specifically, if the communication takes place over permitted protocol and (optionally) ports between users or network endpoints of the system. If a corresponding session is not found, the administrator is alerted to the fact that an unknown type of communication which may represent misuse of the network or a security violation is taking place.

In the current embodiment, the event is placed into one of three categories: 1) the event is consistent with the policies or model (step 516); 2) the event is not encompassed by the policies (step 518); or 3) the event is a breach of one or more of the policies (step 520).

In the case of the event being consistent with the policies (step 516), then the process flow simply returns to step 511 to await detection of the next event. However, in some cases, the event is further logged to a file to enable later analysis.

In other cases, the policies do not encompass the detected communication event as in step 518. That is to say, the policies set forth neither that the event is consistent with the proper operation of the network nor that the communications event constitutes a threat to the network or other undesirable behavior. This categorization is typically indicative of an incomplete or non-covering model 115. For example, a new user may have been added to the network and consequently the model does not provide any indication concerning nominal communication behavior for this user.

Thus, in the preferred embodiment, in step 526, the threat level is categorized. Not all unclassified events require immediate intervention if any. Some are simply tracked, other blocked and still other allowed.

A notification is generated in step 522 indicating that a detected event was not covered by established policies. The event is logged in step 524.

In step 540, the previously-determined threat level for the event is used to take at least one of two actions in some embodiments.

If the event is benign and determined to be consistent with the proper operation of the network, then the event is preferably passed to the NMM 110 for inclusion in the model and updating of the policies in step 542.

However, if the event is deemed a threat, a security response is initiated in some examples in step 534. This can include further, closer monitoring, quarantine of the communications, blocking of communications, or removal of the client or user from the network.

Finally, where the communication event breaches one or more policies, in step 520, often a number of follow-up actions are taken.

In step 526, the threat level is categorized. Not all policy violations require immediate intervention. Some are simply tracked and counted to ensure that some level, such as total authentication server bandwidth, is not chronically exceeded.

In step 528, an alert is sometimes generated. Typically, the alert is generated based on the assigned threat level.

In step 530, the policy violation is logged. Finally, in step 534, changes to the network can be initiated such as quarantine of the user or host computer violating the policy. In other examples, network communications devices are reconfigured to mitigate the threat. Communications can be blocked or client or user removed from the network.

It is important to note that in the present invention, it is difficult to associate a specific user with the dataflow when two users are sharing a single host computer. For example, if two individuals are logged onto a given host, and the host talks to a network entity, for which any one of the users is authorized, it is difficult to identify this as a violation of the network policy, if the unauthorized user initiated the communication. Thus, there is difficulty in establishing direct causality in some instances. Thus, when policies are applied to host computers with multiple users, then usually the most permissive policy between the various users is applied or a hybrid policy applied.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for generating and using security policies for a computer network, the method comprising:

detecting authentication events involving host computers contacting authentication servers on the computer network by monitoring activity involving the authentication servers;

extracting authentication information for each of the authentication events including user names, host computer addresses, destination addresses, and authentication protocols from the authentication events and updating a usage model database containing legitimate network communications with the extracted authentication information including the user names, host computer addresses, destination addresses, and authentication protocol;

using the authentication information of the usage model database to define security policies, the usage model characterizing legitimate network communications by reference to at least user names, host computer addresses, and destination addresses;

detecting new authentication events on the computer network;

extracting authentication information from the authentication events; and comparing the authentication information against the security policies for the network, the security policies defining legitimate network communications with respect to at least the user names, the host computer addresses, the destination addresses and the authentication protocols, and generating alerts if the new authentication events violate the security policies and indicating modification of the usage model if the new authentication events are not encompassed by the security policies, that is neither consistent with the security policies nor a breach of the security policies.

2. A method as claimed in claim 1, wherein the step of detecting authentication events is performed by collectors that monitor authentication servers.

3. A method as claimed in claim 1, wherein the step of detecting authentication events is performed by collectors that monitor log files from authentication servers.

4. A method as claimed in claim 1, wherein the step of detecting authentication events is performed by collectors that access authentication servers via application programming interfaces.

5. A method as claimed in claim 1, wherein the step of extracting authentication information comprises collecting information from authentication servers and network communications.

6. A method as claimed in claim 1, wherein the step of extracting authentication information comprises capturing user names, host computer addresses and communications protocols.

7. A method as claimed in claim 1, wherein the step of using the authentication information comprises defining security policies based on the authentication information.

8. A method as claimed in claim 1, wherein the security policies proscribe the authentication events.

9. A method as claimed in claim 1, wherein the usage model additionally characterizes legitimate network communications by reference to communications ports and the security policies define legitimate network communications additionally with respect to the communications ports.

10. A method as claimed in claim 1, wherein the usage model is indexed by user names.

11. A method as claimed in claim 1, wherein the usage model stores whether the authentication protocols are TACACS, RADIUS, and LDAP.

12. A method for monitoring security in a computer network, the method comprising:
    detecting communication events on the computer network;
    extracting authentication information from the communication events including user names of users of host computers seeking authentication, addresses of the host computers, and authentication protocols; and
    generating a model of the authentication state of the network including the user names, the addresses of the host computers, and the authentication protocols of the authentication information extracted from the communication events;
    monitoring new authentication events and comparing the authentication events against the model and generating alerts if the new authentication events violate security policies based on the model including the user names, the addresses of the host computers, and the authentication protocols of the new authentication and indicating modification of the model if the new authentication events are not encompassed by the security policies, that are neither consistent with the security policies nor a breach of the security policies.

13. A method as claimed in claim 12, wherein the step of detecting communication events comprises monitoring communications on the network.

14. A method as claimed in claim 12, wherein the step of detecting communication events comprises monitoring communications on the network via a network communications device.

15. A method as claimed in claim 12, wherein the step of extracting authentication information comprises collecting information from authentication servers and network communications.

16. A method as claimed in claim 12, wherein the step of extracting authentication information comprises collecting information from log files generated by authentication servers.

17. A method as claimed in claim 12, wherein the step of extracting authentication information comprises capturing the user names, host computer addresses, and communications protocols.

18. A method as claimed in claim 12, wherein the step of generating the model is performed during normal operation of the network.

19. A method as claimed in claim 12, wherein the step of generating the model is performed over a lifetime of the network.

20. A method as claimed in claim 12, wherein the model additionally characterizes the authentication state of the network by reference to communications ports and alerts are generated if new authentication events violate the security policies defined with respect to the communications ports.

21. A computer network security system, comprising:
    collectors for monitoring network communications events and authentication events involving host computers contacting authentication servers including at least user names, host computer addresses, authentication protocols, and destination addresses;
    a modeling mechanism for combining information from the network communications events and the authentication events into a model describing legitimate network activity and creating security policies based on the model, the usage model characterizing legitimate network communications by reference to at least user names, host computer addresses, authentication protocols, and destination addresses; and
    policy notification system for monitoring new authentication events detected by the collectors and comparing the authentication event against the security policies and generating alerts if the new authentication events violate the security policies and indicating modification of the model if the new authentication events are not encompassed by the security policies, that is neither consistent with the security policies nor a breach of the security policies.

22. A computer network security system as claimed in claim 21, wherein the collectors obtain information on network communication events by monitoring network communications devices.

23. A computer network security system as claimed in claim 21, wherein the collectors obtain information on authentication events by monitoring authentication servers.

24. A computer network security system as claimed in claim 23, wherein the collectors access the authentication servers via application programming interfaces.

25. A computer network security system as claimed in claim 23, wherein the collectors access the authentication servers via log files.

26. A computer network security system as claimed in claim 21, wherein the modeling mechanism associates authenticated users with network entities with which they are communicating.

27. A computer network security system as claimed in claim 21, wherein the model additionally characterizes the legitimate network communications by reference to communications ports and the policy notification system generates alerts new authentication events violate the security policies defined with respect to the communications ports.

28. A computer network security system as claimed in claim 21, wherein the model is indexed by user names.

29. A computer network security system as claimed in claim 21, wherein the usage model stores whether the authentication protocols are TACACS, RADIUS, and LDAP.

30. A computer network security system, comprising:
- collectors for monitoring network authentication events on a network;
- a modeling mechanism for combining information from the network authentication events into an authentication state model describing network activity including user names of users of host computers initiating the authentication events, authentication protocols, and addresses of the host computers; and
- a notification system for generating an alert if the network communication events violated security policies by reference to the user names of the users, authentication protocols, and the addresses of the host computers derived from the model and indicating modification of the model if the new authentication events are not encompassed by the security policies, that is neither consistent with the security policies nor a breach of the security policies.

31. A computer network security system as claimed in claim 30, wherein the collectors obtain information on network communication events by monitoring network communications devices.

32. A computer network security system as claimed in claim 30, wherein the collectors obtain information on authentication events by monitoring authentication servers.

33. A computer network security system as claimed in claim 32, wherein the collectors access the authentication servers via application programming interfaces.

34. A computer network security system as claimed in claim 32, wherein the collectors access the authentication servers via log files to obtain the user names of users initiating the authentication events.

* * * * *